United States Patent [19]
Chanzy et al.

[11] Patent Number: 5,881,120
[45] Date of Patent: Mar. 9, 1999

[54] NUCLEAR FUEL ASSEMBLY STORAGE RACK WHOSE CELLS CONTAIN A NEUTROPHAGE SECTION

[75] Inventors: Yves Chanzy, Paris; Bernard Kirchner, Yvette, both of France

[73] Assignee: Transnucleaire, Paris, France

[21] Appl. No.: 838,228

[22] Filed: Apr. 17, 1997

[30] Foreign Application Priority Data

Apr. 19, 1996 [FR] France .................................. 9605188

[51] Int. Cl.⁶ .............................................. G21C 19/20
[52] U.S. Cl. ............................................................ 376/272
[58] Field of Search ............................................. 376/272

[56] References Cited

U.S. PATENT DOCUMENTS

| | | | |
|---|---|---|---|
| 4,024,406 | 5/1977 | Bevilacqua | 376/272 |
| 4,124,445 | 11/1978 | Mollon | 376/272 |
| 4,305,787 | 12/1981 | Rivacoba | 376/272 |
| 4,567,015 | 1/1986 | Bosshard | 376/272 |
| 4,788,029 | 11/1988 | Kerjean | 376/272 |
| 5,032,348 | 7/1991 | Blum et al. | 376/272 |
| 5,719,910 | 2/1998 | Robert et al. | 376/272 |

FOREIGN PATENT DOCUMENTS

| | | |
|---|---|---|
| 120232 | 10/1984 | European Pat. Off. . |
| 520438 | 12/1992 | European Pat. Off. . |
| 2680909 | 3/1993 | France . |
| 2835392 | 2/1980 | Germany ................................ 376/272 |
| 53-065597 | 6/1978 | Japan ..................................... 376/272 |
| 5040195 | 2/1993 | Japan . |
| 08-136695 | 5/1996 | Japan ..................................... 376/272 |
| 9420964 | 9/1994 | WIPO . |

*Primary Examiner*—Charles T. Jordan
*Assistant Examiner*—M. J. Lattig
*Attorney, Agent, or Firm*—Dennison, Meserole, Pollack & Scheiner

[57] ABSTRACT

A rack for storing or transporting nuclear fuel assemblies includes a plurality of adjacent prismatic cells having cell walls defining interior fuel assembly storage spaces. The cell walls are formed from a criss-crossed, ordered stack of elongated structural elements of constant cross section, disposed in successive layers and having a long dimension perpendicular to the axis of the cells. Neutrophage sections in tubular form and having a cross section corresponding to that of the cells are disposed against the cell walls within the nuclear fuel assembly storage spaces.

3 Claims, 1 Drawing Sheet

NUCLEAR FUEL ASSEMBLY STORAGE RACK WHOSE CELLS CONTAIN A NEUTROPHAGE SECTION

FIELD OF THE INVENTION

The present invention relates to a storage rack comprising a plurality of cells in which nuclear fuel assemblies are stored.

More precisely, it relates to the racks constituted by an ordered stack of elongated structural elements, of the sectional type, disposed in successive layers so as to form these cells.

These storage racks, also known as storage baskets, are used to store fuel assemblies either in pools or dry and/or to transport them in shielded enclosures, which may be drained after loading.

DESCRIPTION OF RELATED ART

Nuclear fuel assembly storage racks are usually constituted by adjacent prismatic cells, most often of square cross-section, with a shape that is elongated along a major axis. The shape of the cross-section of the cells is generally similar to that of the fuel assemblies to be stored, and their height is at least equal to that of the fuel assemblies.

The racks according to the invention are suitable for the storage of unspent nuclear fuel assemblies requiring subcritical conditions, which fuel can be based on uranium oxide exclusively or on any mixture of combustible oxides, but they are particularly suitable for the storage and transport of spent fuel assemblies in shielded enclosures.

In this case a rack must simultaneously fulfill several functions:

transfer of the heat generated by the stored spent fuel assemblies to the wall of the shielded enclosure in order to dissipate it. This function is fulfilled more effectively when the material which constitutes the rack is a good heat conductor and when the contact between the rack and the wall of the enclosure is more secure;

neutron absorption to guarantee a subcritical state of the rack when loaded with fuel, whether dry or immersed in water during storage in a pool or during the operations for loading and unloading the shielded enclosures, which are generally also carried out in a pool. This function is fulfilled through the use of materials which contain neutron-absorbing or neutrophage elements, such as B, Gd, Hf, Cn, In, Si, etc., which materials are directly incorporated into the design of the rack, as well as through the production of good neutron moderation obtained by providing, in proximity to these materials, empty spaces which are available for water during filling;

sufficiently high mechanical strength to support the load of fuel assembles during transport and to maintain the geometry of the rack, even in case of shock, when necessary in order to maintain subcritical conditions.

To fulfill these functions, French patent 2627622 discloses a rack for storing nuclear fuel assemblies constituted by a plurality of adjacent prismatic cells of ample length, disposed parallel to one another and intended to receive these fuel assemblies.

In order that known, reliable materials may be used for its construction, the walls of the cells are constituted by a criss-crossed, ordered stack of elongated structural elements of the sectional type, of constant cross-section, disposed in successive layers perpendicular to the axis of the cells, which walls ensure the control of criticality, particularly due to their thickness and to neutrophage rods disposed inside these walls parallel or perpendicular to the axis of the cells.

Thus, the framework of the rack is formed by a stack of structural elements which are sections of the usual type with simple shapes, made from known materials. This stack constitutes the walls of the cells for the fuel assemblies; neutrophage rods are inserted within the thickness of these walls, which can be rods made from an alloy of aluminum with boron that are inexpensive and are commonly used to incorporate boron in aluminum alloys.

Moreover, the use of neutrophage rods generally makes it necessary to pierce a large number of holes into the sections, in order to place these rods within the thickness of the walls; this is the case, for example, when the walls of the cells are constituted by a stack of H-shaped structural elements (see FIG. 2 of the above-mentioned patent).

French patent 2650113 shows another way of inserting the neutrophage material inside the walls constituted by a stack of sections, which makes it possible to avoid piercing a large number of holes. It consists of attaching the elements of neutrophage material (flat strips) to the inside of the walls so that they rest against the sections, with the aid of fastening means which are integral with these sections, for example shoulders obtained during their extrusion.

However, the placement of these rods or strips inside the walls has the drawback of requiring holes in the sections and/or special shapes for the sections; this means that even though the section is made from a common material, its shape is complicated or requires adaptations (for example, holes), details which increase production costs. Moreover, the placement of the neutrophage material inside the walls while the sections are stacked is not easy.

Thus, the Applicant sought to create racks using sections which do not include specific devices for attaching the elements of neutrophage material and which make it possible to avoid the difficulty of inserting these elements within the walls.

SUMMARY OF THE INVENTION

The invention is a rack for nuclear fuel assemblies, for the purpose of storing or transporting them, comprising a plurality of identical adjacent prismatic cells of ample length, disposed parallel to one another and intended to receive these fuel assemblies, whose walls are constituted by a criss-crossed, ordered stack of elongated structural elements of the sectional type, of constant cross-section, disposed in successive layers, whose large dimension is disposed perpendicular to the axis of the cells, which elements fulfill at least the functions of mechanical strength and heat conductivity, characterized in that sections of simple shape made of neutrophage material are inserted into all of the cells and rest against their walls.

Thus, the sections of neutrophage material have a general direction which is parallel to the major axis of the cells and perpendicular to the major axis of the sections constituting the stack which fulfill the mechanical strength function of the rack. Moreover, these sections of neutrophage material disposed against the inner walls of the cells directly face the nuclear fuel assemblies stored in the same cells.

These neutrophage sections are advantageously tubes whose cross-section, which can be, for example, polygonal, square, rectangular or hexagonal, corresponds to that of the cells, so that they are plated to the walls of these cells.

Sections of this type are inexpensive to obtain on the market, and their tubular shape allows them to be installed in a single operation and to be wedged into their final position in the cell which receives the fuel assemblies, in a particularly easy way. No device or means for fastening or holding is necessary.

It is also possible to use so-called "open" tubes, which lack one or more walls along their entire length so as to produce open tubes which only partially cover the walls of the cells. Thus, it is possible to have quarter-tubes, half-tubes, third-tubes, etc., provided that the tube always comprises at least two adjacent walls which allow it to wedge itself into the cells.

The neutrophage sections can also occur in the form of flat strips applied to only one wall of a cell and held in place by fastening devices located, for example, at the ends of the cells.

Another variant of embodiment consists of incorporating a chemical neutrophage element into the sections of the stack, in such a way that the latter constitutes a stack in which all the sections of simple shape are made of a known, neutrophage material which is easily homologated, for example aluminum or aluminum alloys containing a neutrophage element.

It is possible to use, as neutrophage materials, metals or metal alloys such as Al, Cu, Fe, Cr, Ni or their alloys, charged with boron or other neutrophage elements such as Gd, Hf, Cd, In, Li, etc., or with their compounds, for example $B_4C$.

Thus, the neutrophage sections can be of Boral (registered trademark), which is a sandwich complex formed by the simultaneous rolling of two aluminum plates which enclose between them a mixture of $B_4C$ powder and aluminum.

DESCRIPTION OF THE PREFERRED EMBODIMENT

Figure 1:
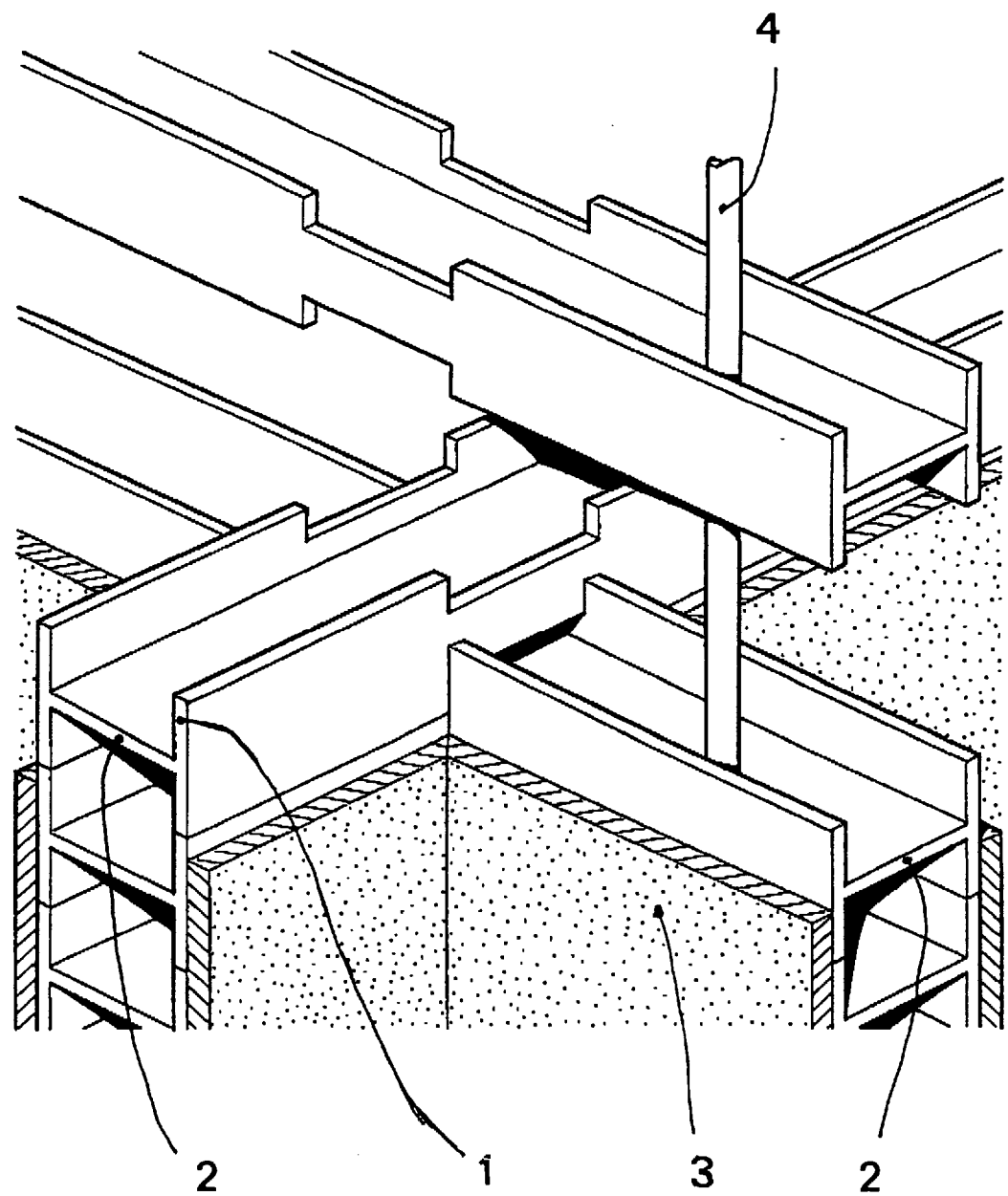
FIG. 1 shows an exploded view in perspective of an advantageous exemplary embodiment of the invention using H-shaped structural elements, the stacking of which constitutes cells, which are then equipped with neutrophage sections in the form of tubes.

FIG. 1 shows the H-shaped sections having vertical legs (1), each of which is formed by two upper and lower half-legs and a horizontal web (2). At (3) there is a partial view of a tube of square cross-section which corresponds to the shape of the inner wall of the cell into which it has been inserted. At (4) is a rod which serves to hold the stack of structural elements in place. The number of these rods is limited. They are parallel to the axis of the cells and are disposed either inside the thickness of the wall (which is the case here) or in the peripheral areas of the rack which do not receive any fuel assemblies.

Thus, the device according to the invention makes it possible:

to eliminate the cost of operations for piercing the structural elements so as to allow vertical neutrophage rods to pass through them in accordance with the prior art, to avoid reducing the mechanical strength and the thermal capacity of the sections through multiple piercings, to use sections of simple shape for both the structural stack and for the incorporation of the neutrophage element, to reduce the cost of the rack by facilitating the placement of the neutrophage material.

This device makes it possible to store and transport fuel assemblies under water or dry, but it is particularly suitable for the dry transport of these assemblies in shielded enclosures.

What is claimed is:

1. A rack for storing or transporting nuclear fuel assemblies comprising:

a) a plurality of adjacent prismatic cells of defined axis having cell walls defining interior fuel assembly storage spaces, said cells having a length sufficient to receive the fuel assemblies and being parallel to one another, the cell walls comprising a criss-crossed, ordered stack of elongated structural elements of constant cross section, disposed in successive layers and having a long dimension perpendicular to the defined axis, said elements having sufficient structural strength and heat conductivity for storage of the nuclear fuel assemblies; and b) neutrophage sections in tubular form and having a cross sectional shape corresponding to that of the cells, the neutrophage sections being disposed against the cell walls within the fuel assembly storage spaces.

2. The rack according to claim 1, wherein the neutrophage sections are in the form of tubes which are closed or open in a lengthwise direction.

3. The rack according to claim 1, additionally comprising at least one neutrophage element incorporated into the stack to provide structural strength.

* * * * *